(12) United States Patent
Chen et al.

(10) Patent No.: US 10,313,601 B2
(45) Date of Patent: Jun. 4, 2019

(54) IMAGE CAPTURING DEVICE AND BRIGHTNESS ADJUSTING METHOD

(71) Applicant: VIVOTEK INC., New Taipei (TW)

(72) Inventors: Wei-Shiu Chen, New Taipei (TW); Shih-Hsuan Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/915,025

(22) Filed: Mar. 7, 2018

(65) Prior Publication Data

US 2018/0262667 A1 Sep. 13, 2018

(30) Foreign Application Priority Data

Mar. 13, 2017 (TW) .............................. 106108119 A (51) Int. Cl.
*H04N 5/235* (2006.01)
*H04N 5/243* (2006.01)
(Continued)

(52) U.S. Cl.
CPC ......... *H04N 5/2352* (2013.01); *H04N 5/2256* (2013.01); *H04N 5/238* (2013.01);
(Continued)

(58) Field of Classification Search
CPC ........... G06K 9/00771; G06K 9/00201; G06K 9/00221; G06K 9/00362; G06K 9/00369; G06T 2207/30232; H04N 7/186; H04N 5/23206; H04N 5/23203; H04N 5/235; H04N 5/2352; H04N 5/2354; H04N 5/2256; H04N 5/2353; H04N 5/243; H04N 5/353; H04N 5/33; H04N 5/3572; H04N 9/045; H04N 5/2351; H04N 5/238; G03B 15/03
(Continued)

(56) References Cited

U.S. PATENT DOCUMENTS 7,415,202 B2 * 8/2008 Fujimoto ............... G03B 15/02
348/370
8,077,224 B2 12/2011 Asoma
(Continued)

FOREIGN PATENT DOCUMENTS

| CN | 102118563 A | 7/2011 |
|---|---|---|
| CN | 102143325 B | 7/2014 |
| CN | 103190144 B | 1/2016 |

*Primary Examiner* — Albert H Cutler
(74) *Attorney, Agent, or Firm* — Winston Hsu (57) ABSTRACT

An image capturing device includes a plurality of light emitters, an image capturer, a memory and a processor. The memory stores a target brightness value. The processor controls the light emitters to emit light and controls the image capturer to capture an image. The image is divided into a plurality of areas and the light emitted by each of the light emitters corresponds to one of the areas. The processor calculates a current brightness value of each area and calculates an absolute difference between the current brightness value of each area and the target brightness value. The processor determines whether each absolute difference is larger than a first threshold. According to a determination result, the processor adjusts an exposure parameter of the image capturer or adjusts a light emitting intensity of the light emitter corresponding to the area with the absolute difference larger than the first threshold.

10 Claims, 5 Drawing Sheets

(51) Int. Cl.
*H04N 5/238* (2006.01)
*H04N 5/225* (2006.01)

(52) U.S. Cl.
CPC ......... *H04N 5/2351* (2013.01); *H04N 5/2353* (2013.01); *H04N 5/2354* (2013.01); *H04N 5/243* (2013.01)

(58) Field of Classification Search
USPC .................................... 348/370, 143–159
See application file for complete search history.

(56) References Cited

U.S. PATENT DOCUMENTS

| | | | |
|---|---|---|---|
| 8,106,966 B2 | 1/2012 | Chou | |
| 10,175,559 B1* | 1/2019 | Ng | G03B 15/05 |
| 2006/0263077 A1* | 11/2006 | Endo | G03B 7/16 396/155 |
| 2008/0024523 A1* | 1/2008 | Tomite | G06T 15/50 345/632 |
| 2008/0170846 A1* | 7/2008 | Wang | A61B 1/00096 396/182 |
| 2008/0316355 A1* | 12/2008 | Fukugawa | H04N 5/2351 348/364 |
| 2012/0294600 A1* | 11/2012 | Osawa | G03B 7/08 396/164 |
| 2013/0044225 A1* | 2/2013 | Jeon | H04N 5/2351 348/207.1 |
| 2013/0076927 A1* | 3/2013 | Lee | H04N 5/2351 348/216.1 |
| 2015/0069917 A1* | 3/2015 | Shih | H05B 33/0851 315/151 |
| 2015/0085097 A1* | 3/2015 | Larsen | H04N 5/33 348/78 |
| 2016/0165154 A1* | 6/2016 | Shinomiya | G06F 3/017 348/164 |
| 2016/0192834 A1* | 7/2016 | Niida | H04N 5/2256 600/109 |
| 2016/0381272 A1* | 12/2016 | Wang | H04N 5/2351 348/143 |
| 2017/0118459 A1* | 4/2017 | Kim | H04N 5/33 |
| 2017/0249501 A1* | 8/2017 | Van der Sijde | G06K 9/00255 |
| 2018/0359424 A1* | 12/2018 | Shibusawa | G06T 7/20 |
| 2019/0098194 A1* | 3/2019 | Brick | G06K 9/00255 |

\* cited by examiner

FIG. 5

IMAGE CAPTURING DEVICE AND BRIGHTNESS ADJUSTING METHOD

BACKGROUND OF THE INVENTION

1. Field of the Invention

The invention relates to an image capturing device and a brightness adjusting method and, more particularly, to an image capturing device and a brightness adjusting method capable of improving image visibility effectively.

2. Description of the Prior Art

Since safety awareness is being raised gradually, people pay much attention to safety surveillance application. So far in many public or non-public places, there are always one or more cameras installed for safety surveillance. Furthermore, some cameras are equipped with a light emitting unit (e.g. infrared light) for assisting in illuminating at night or in a dark scene, such that the camera can capture a visible image successfully. However, when an object is close to the camera, the object located in the foreground of the image may be overexposed, such that the details of the object in the image cannot be obtained. The prior art may make the object located in the foreground of the image more clearly by adjusting exposure parameter. However, the aforesaid manner will make the visibility of the background of the image worse.

SUMMARY OF THE INVENTION

An objective of the invention is to provide an image capturing device and a brightness adjusting method capable of improving image visibility effectively.

According to an embodiment of the invention, an image capturing device comprises a plurality of light emitters, an image capturer, a memory and a processor, wherein the processor is electrically connected to the light emitters, the image capturer and the memory. The memory stores a target brightness value. The processor controls the light emitters to emit light and controls the image capturer to capture an image. The image is divided into a plurality of areas and the light emitted by each of the light emitters corresponds to one of the areas. The processor calculates a current brightness value of each area and calculates an absolute difference between the current brightness value of each area and the target brightness value. The processor determines whether each absolute difference is larger than a first threshold. According to a determination result, the processor calculates an amount M of the areas with the current brightness value larger than the target brightness value and calculates another amount N of the areas with the current brightness value smaller than the target brightness value, wherein M and N are equal to 0 or an positive integer, and M and N are not equal to 0 simultaneously. The processor determines whether M or N is larger than a second threshold. When M or N is larger than the second threshold, the processor adjusts an exposure parameter of the image capturer. When M and N both are not larger than the second threshold, the processor adjusts a light emitting intensity of the light emitter corresponding to the area with the absolute difference larger than the first threshold.

According to another embodiment of the invention, a brightness adjusting method is applied to an image capturing device. The image capturing device comprises a plurality of light emitters, an image capturer, a memory and a processor, wherein the processor is electrically connected the light emitters, the image capturer and the memory. The memory stores a target brightness value. The brightness adjusting method comprises steps of the processor controlling the light emitters to emit light; the processor controlling the image capturer to capture an image, wherein the image is divided into a plurality of areas and the light emitted by each of the light emitters corresponds to one of the areas; the processor calculating a current brightness value of each area and calculating an absolute difference between the current brightness value of each area and the target brightness value; the processor determining whether each absolute difference is larger than a first threshold; according to a determination result, the processor calculating an amount M of the areas with the current brightness value larger than the target brightness value and calculating another amount N of the areas with the current brightness value smaller than the target brightness value, wherein M and N are equal to 0 or an positive integer, and M and N are not equal to 0 simultaneously; the processor determining whether M or N is larger than a second threshold; when M or N is larger than the second threshold, the processor adjusting an exposure parameter of the image capturer; and when M and N both are not larger than the second threshold, the processor adjusting a light emitting intensity of the light emitter corresponding to the area with the absolute difference larger than the first threshold.

As mentioned in the above, the invention determines to adjust the exposure parameter of the image capturer and/or adjust the light emitting intensity of a specific light emitter according to the difference between the current brightness value of each area of the image and the target brightness value. The whole brightness of the image can be adjusted by adjusting the exposure parameter of the image capturer. The brightness corresponding to a specific area can be changed by adjusting the light emitting intensity of the specific light emitter. Accordingly, the invention can balance the brightness of all areas in the image according to the aforesaid brightness adjusting method, so as to improve image visibility effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
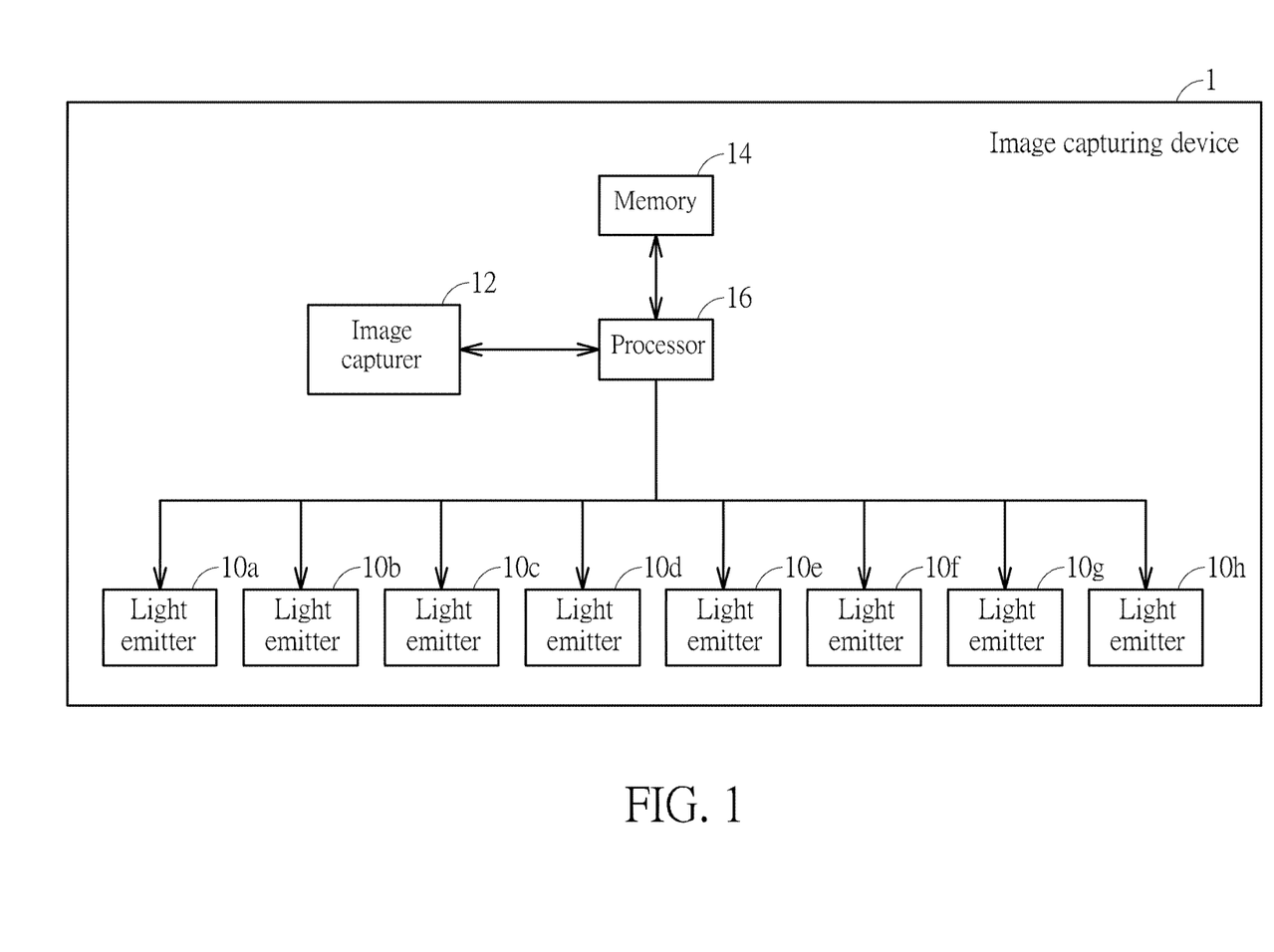
FIG. 1 is a functional block diagram illustrating an image capturing device according to an embodiment of the invention.
Figure 2:
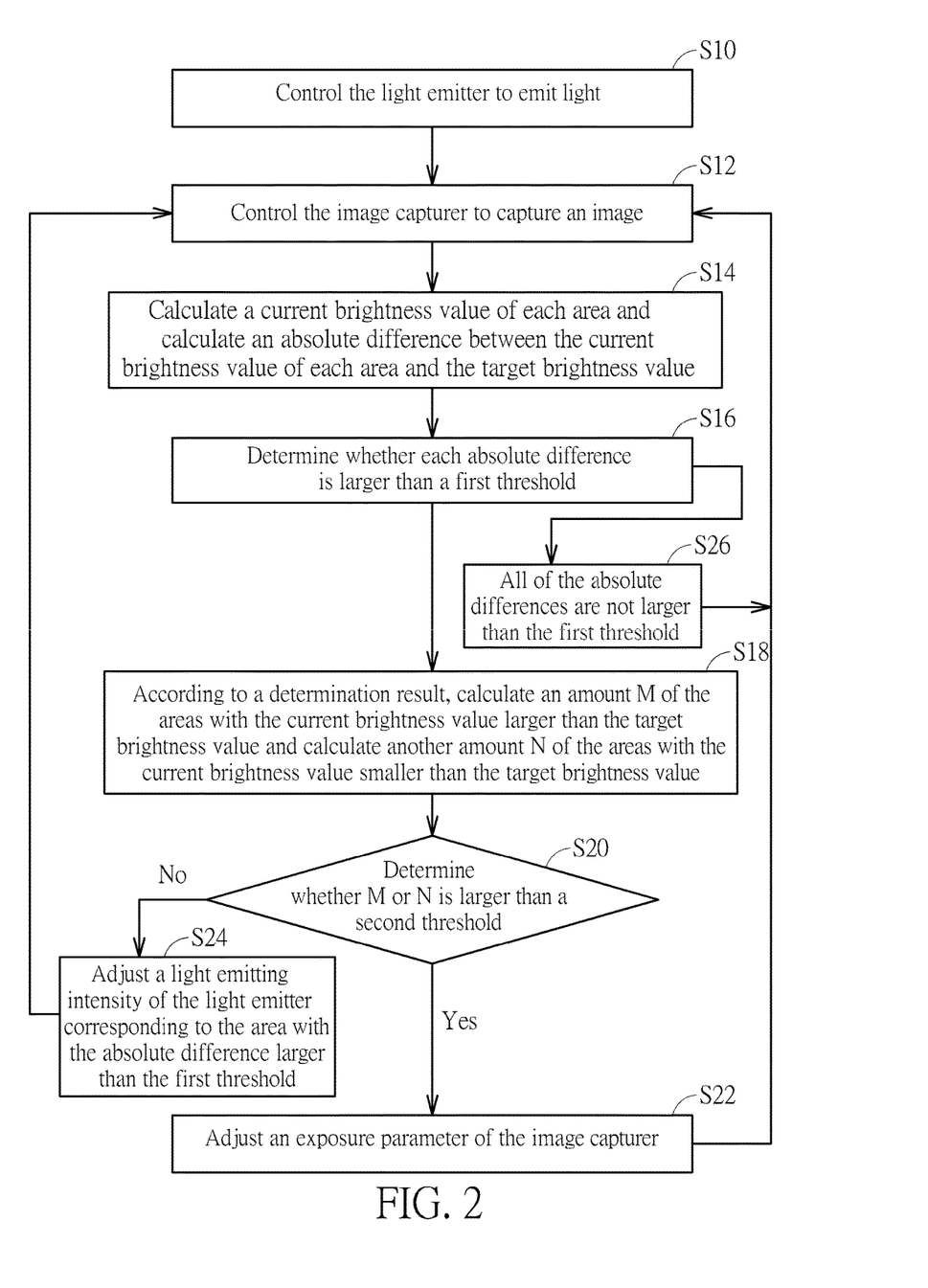
FIG. 2 is a flowchart illustrating a brightness adjusting method according to an embodiment of the invention.
Figure 3:
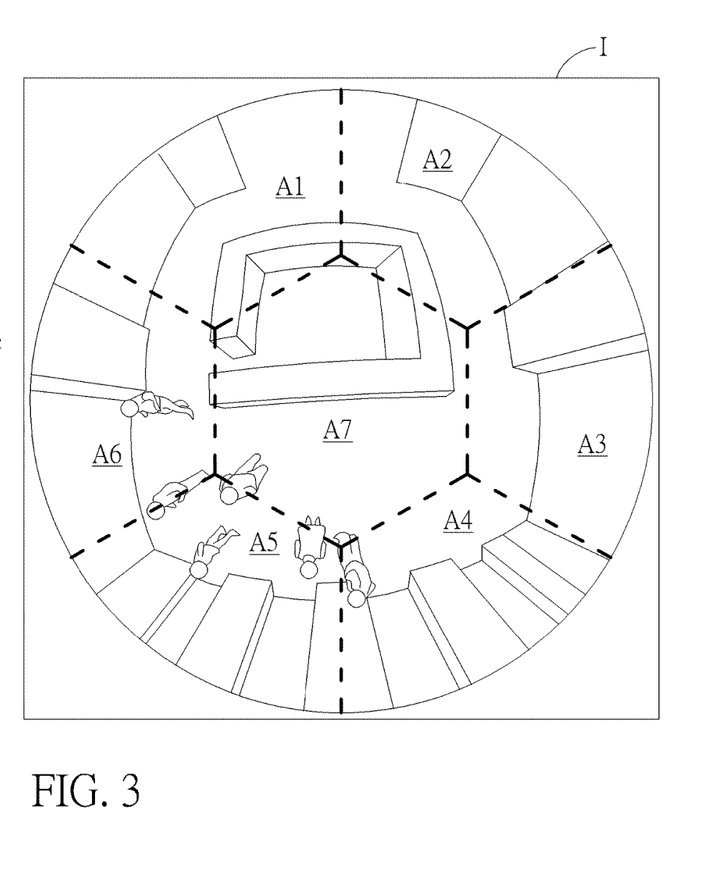
FIG. 3 is a schematic diagram illustrating a relationship between the light emitters of the image capturing device shown in FIG. 1 and the areas of the image.

Referring to FIGS. 1 to 3, FIG. 1 is a functional block diagram illustrating an image capturing device 1 according to an embodiment of the invention, FIG. 2 is a flowchart illustrating a brightness adjusting method according to an embodiment of the invention, and FIG. 3 is a schematic diagram illustrating a relationship between the light emitters 10a-10h of the image capturing device 1 shown in FIG. 1 and the areas A1-A7 of the image I. The brightness adjusting method shown in FIG. 2 is applied to the image capturing device 1 shown in FIG. 1.

As shown in FIG. 1, the image capturing device 1 comprises a plurality of light emitters 10a-10h, an image capturer 12, a memory 14 and a processor 16, wherein the processor 16 is electrically connected to the light emitters 10a-10h, the image capturer 12 and the memory 14. In practical applications, the light emitters 10a-10h may be infrared light emitting diodes or other light sources; the image capturer 12 may be a fish-eye lens, a wide angle lens or an equivalent wide angle lens consisting of a plurality of lenses; the memory 14 may be a memory or other data storage device; the processor 16 may be a processor or a controller with data calculating/processing function. In general, the image capturing device 1 may be further equipped with some necessary hardware or software components for specific purposes, such as a circuit board, a power supply, applications, a communication module, etc., and it depends on practical applications. In this embodiment, the memory 14 stores a target brightness value YT. The target brightness value YT is a brightness of an image and may be a system default value or set by a user.

The image capturing device 1 may be installed in a scene and used to monitor the scene. When the light in the scene is insufficient, the processor 16 may control the light emitters 10a-10h to emit light (step S10 in FIG. 2), so as to provide light for the image capturer 12 to capture an image. In practical applications, the image capturing device 1 may comprise alight sensor (not shown) for sensing the light of the scene. Then, the processor 16 controls the image capturer 12 to capture an image I of the scene (step S12 in FIG. 2). In this embodiment, the light emitters 10a-10h may emit light for specific areas in the scene correspondingly. Therefore, the image I may be divided into a plurality of areas A1-A7 according to the specific areas and the light emitted by each of the light emitters 10a-10h corresponds to one of the areas A1-A7. As shown in FIG. 3, the light emitted by the light emitters 10a-10f corresponds to the areas A1-A6, respectively, and the light emitted by the light emitters 10g-10h corresponds to the area A7. It should be noted that the number of the light emitters and the relationship between the light emitters and the areas of the image may be determined according to practical applications, so the invention is not limited to the embodiment shown in the figure.

Figure 4:
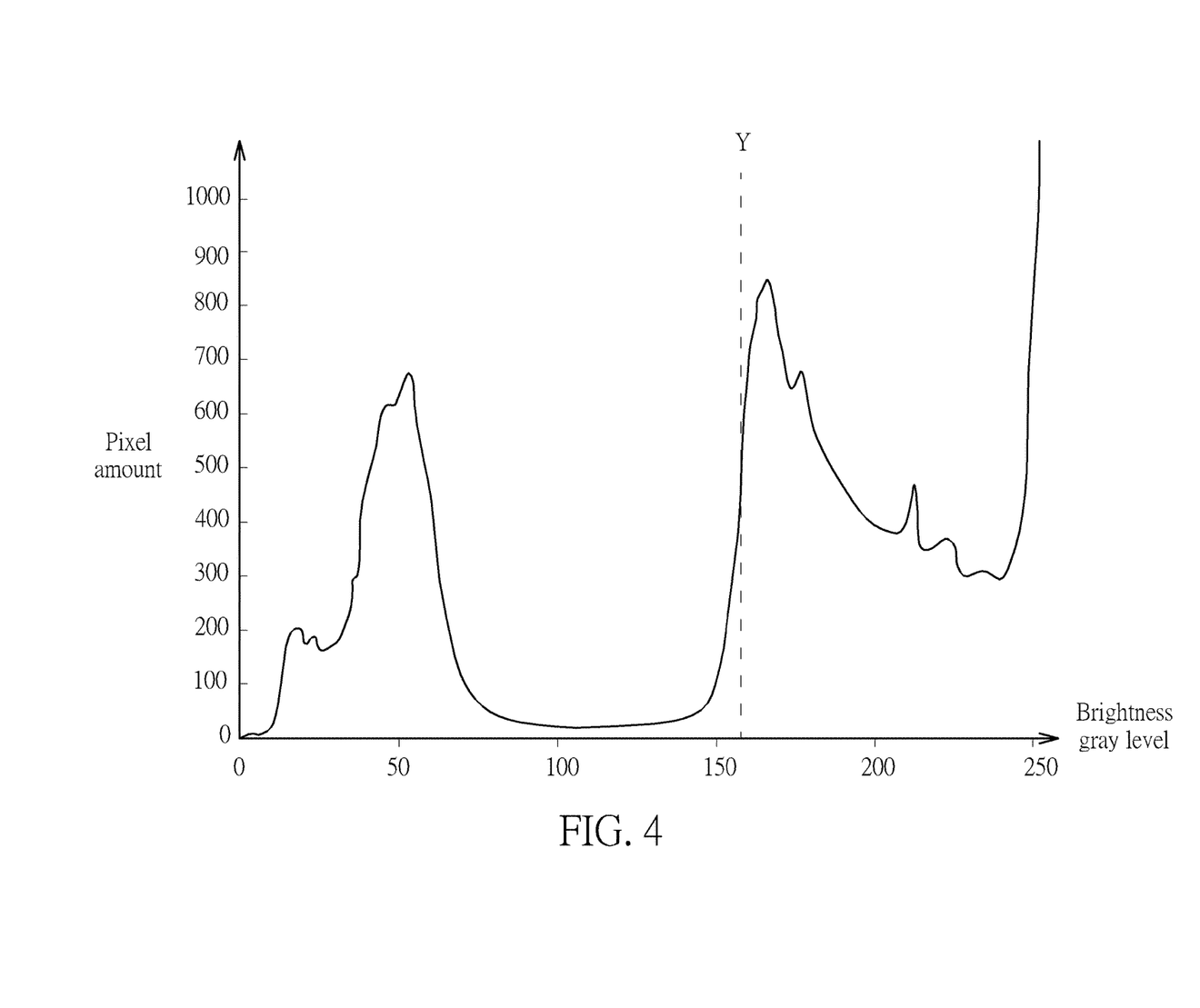
FIG. 4 is a schematic diagram illustrating the brightness distribution of one of the areas.
Figure 5:
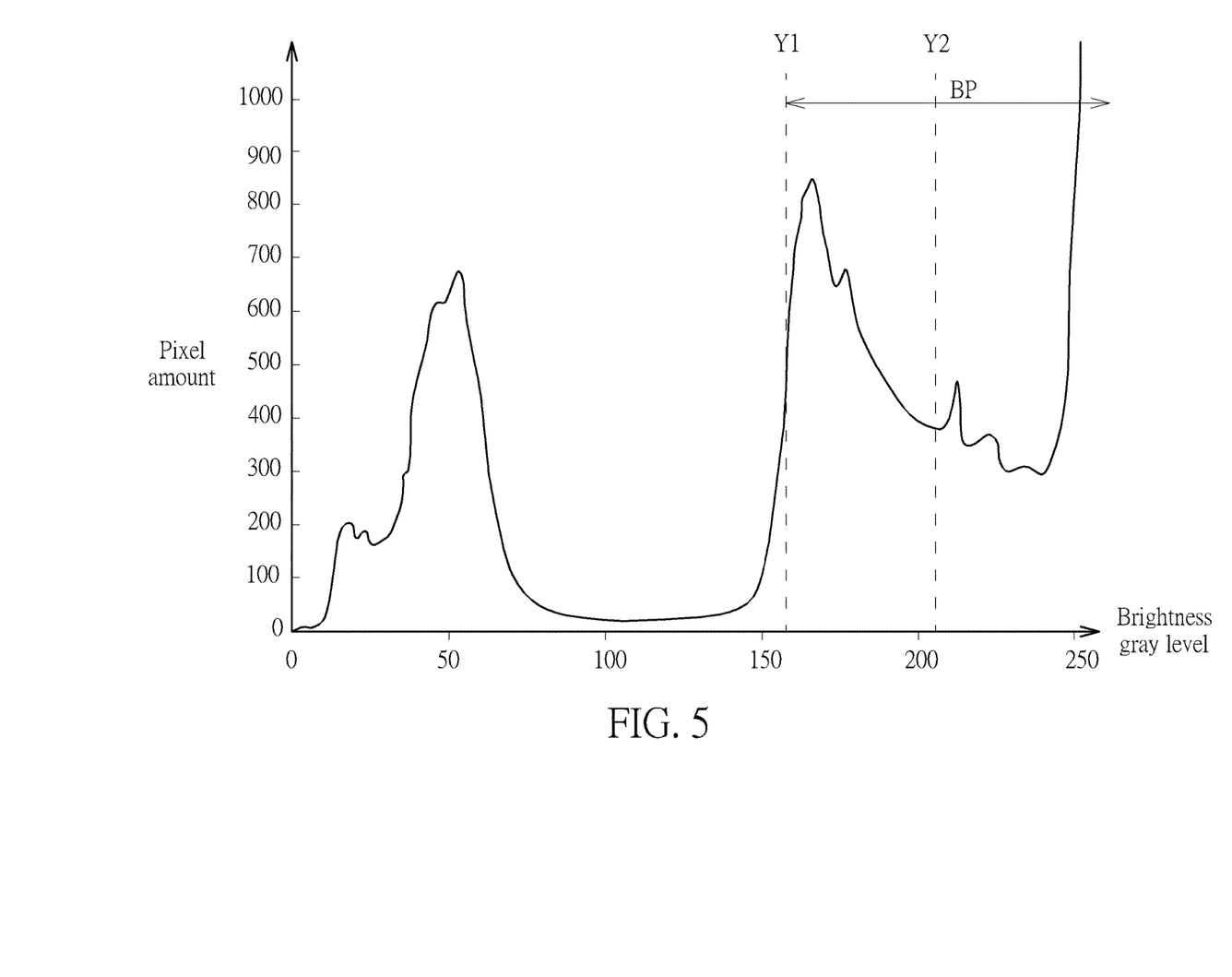
FIG. 5 is a schematic diagram illustrating the brightness distribution of one of the areas.

Then, the processor 16 calculates a current brightness value YC of each area A1-A7 and calculates an absolute difference |YT−YC| between the current brightness value YC of each area A1-A7 and the target brightness value YT (step S14 in FIG. 2). Referring to FIGS. 4 and 5, FIG. 4 is a schematic diagram illustrating the brightness distribution of one of the areas A1-A7 and FIG. 5 is a schematic diagram illustrating the brightness distribution of one of the areas A1-A7. The aforesaid current brightness value YC may be calculated and obtained according to different embodiments shown in FIGS. 4 and 5. In an embodiment, as shown in FIG. 4, the processor 16 may calculate an averaged brightness value Y of all pixels in an area and takes the averaged brightness value Y to be the aforesaid current brightness value YC. In another embodiment, as shown in FIG. 5, the processor 16 may calculate a first averaged brightness value Y1 of all pixels in an area, defines a bright part BP in the area according to the first averaged brightness value Y1, calculates a second averaged brightness value Y2 of all pixels in the bright part BP, and takes the second averaged brightness value Y2 to be the aforesaid current brightness value YC. The invention may select one of the aforesaid two embodiments to calculate the current brightness value YC of each area A1-A7 according to practical applications. Accordingly, the processor 16 may calculate and obtain seven absolute differences |YT−YC| corresponding to seven areas A1-A7 according to the aforesaid manner. It should be noted that the brightness distribution shown in FIGS. 4 and 5 may be rendered by histogram.

Then, the processor 16 determines whether each absolute difference |YT−YC| is larger than a first threshold (step S16 in FIG. 2). In this embodiment, the first threshold may be set according to a brightness tolerance of the image capturing device 1. Then, according to a determination result, the processor 16 calculates an amount M of the areas with the current brightness value YC larger than the target brightness value YT and calculates another amount N of the areas with the current brightness value YC smaller than the target brightness value YT, wherein M and N are equal to 0 or an positive integer, M and N are not equal to 0 simultaneously. The invention may calculate the aforesaid amounts M and N according to one of the following two manners.

First manner: when the absolute difference |YT−YC| of at least one of the areas A1-A7 is larger than the first threshold, the processor 16 calculates the aforesaid amounts M and N for all of the areas A1-A7.

Second manner: the processor 16 calculates the aforesaid amounts M and N only for the areas with the absolute difference |YT−YC| larger than the first threshold. For example, if the absolute difference |YT−YC| of three areas A1, A3, A6 of the areas A1-A7 is larger than the first threshold, the processor 16 calculates the aforesaid amounts M and N only for the three areas A1, A3, A6.

Then, the processor 16 determines whether M or N is larger than a second threshold (step S20 in FIG. 2). If a number of the light emitters is equal to P, the second threshold is equal to [P/2], P is an positive integer larger than 1. In this embodiment, the number of the light emitters is equal to 8, so the second threshold is equal to [8/2], i.e. the second threshold is equal to 4. In another embodiment, if the number of the light emitters is equal to 7, the second threshold is equal to [7/2], i.e. the second threshold is equal to 3.

When M or N is larger than the second threshold, the processor 16 adjusts an exposure parameter of the image capturer 12 (step S22 in FIG. 2). The whole brightness of the image can be adjusted by adjusting the exposure parameter of the image capturer 12. In this embodiment, the invention may adjust the exposure parameter including aperture size, shutter time and ISO (International Organization for Standardization) value according to an exposure equation.

When M and N both are not larger than the second threshold, the processor 16 adjusts a light emitting intensity of the light emitter corresponding to the area with the absolute difference |YT−YC| larger than the first threshold (step S24 in FIG. 2). For example, if the absolute differences |YT−YC| of the areas A1, A3, A6 are larger than the first threshold, the processor 16 adjusts the light emitting intensity of the light emitters 10a, 10c, 10f corresponding to the areas A1, A3, A6. If the current brightness value YC of an area is larger than the target brightness value YT, it means that the area is too bright, so the processor 16 may decrease the light emitting intensity of the light emitter corresponding to the area. On the other hand, if the current brightness value YC of an area is smaller than the target brightness value YT, it means that the area is too dark, so the processor 16 may increase the light emitting intensity of the light emitter corresponding to the area. That is to say, the brightness corresponding to a specific area can be changed by adjusting the light emitting intensity of the specific light emitter.

After adjusting the exposure parameter of the image capturer 12 or adjusting the light emitting intensity of the specific light emitter, the processor 16 controls the image capturer 12 to capture an image continuously (back to step S12) until the brightness of all areas A1-A7 in the image I balances. Accordingly, the image visibility of the image I can be enhanced effectively.

It should be noted that, in step S16, when determining that all of the absolute differences are not larger than the first threshold (step S26 in FIG. 2), it means that the exposure parameter of the image capturer 12 and the light emitting intensity of the light emitters 10a-10h need not to be adjusted. Accordingly, the processor 16 controls the image capturer 12 to capture an image continuously (back to step S12).

As mentioned in the above, the invention determines to adjust the exposure parameter of the image capturer and/or adjust the light emitting intensity of a specific light emitter according to the difference between the current brightness value of each area of the image and the target brightness value. The whole brightness of the image can be adjusted by adjusting the exposure parameter of the image capturer. The brightness corresponding to a specific area can be changed by adjusting the light emitting intensity of the specific light emitter. Accordingly, the invention can balance the brightness of all areas in the image according to the aforesaid brightness adjusting method, so as to improve image visibility effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing device comprising:
   a plurality of light emitters;
   an image capturer;
   a memory storing a target brightness value; and
   a processor electrically connected to the light emitters, the image capturer and the memory;
   wherein the processor controls the light emitters to emit light and controls the image capturer to capture an image, the image is divided into a plurality of areas, the light emitted by each of the light emitters corresponds to one of the areas; the processor calculates a current brightness value of each area and calculates an absolute difference between the current brightness value of each area and the target brightness value; the processor determines whether each absolute difference is larger than a first threshold; according to a determination result, the processor calculates an amount M of the areas with the current brightness value larger than the target brightness value and calculates another amount N of the areas with the current brightness value smaller than the target brightness value, M and N are equal to 0 or an positive integer, M and N are not equal to 0 simultaneously; the processor determines whether M or N is larger than a second threshold; when M or N is larger than the second threshold, the processor adjusts an exposure parameter of the image capturer; when M and N both are not larger than the second threshold, the processor adjusts a light emitting intensity of the light emitter corresponding to the area with the absolute difference larger than the first threshold.

2. The image capturing device of claim 1, wherein when all of the absolute differences are not larger than the first threshold, the processor controls the image capturer to capture an image continuously.

3. The image capturing device of claim 1, wherein if a number of the light emitters is equal to P, the second threshold is equal to [P/2], P is an positive integer larger than 1.

4. The image capturing device of claim 1, wherein the processor calculates an averaged brightness value of all pixels in the area and takes the averaged brightness value to be the current brightness value.

5. The image capturing device of claim 1, wherein the processor calculates a first averaged brightness value of all pixels in the area, defines a bright part in the area according to the first averaged brightness value, calculates a second averaged brightness value of all pixels in the bright part, and takes the second averaged brightness value to be the current brightness value.

6. A brightness adjusting method applied to an image capturing device, the image capturing device comprising a plurality of light emitters, an image capturer, a memory and a processor, the memory storing a target brightness value, the processor being electrically connected the light emitters, the image capturer and the memory, the brightness adjusting method comprising steps of:
   the processor controlling the light emitters to emit light;
   the processor controlling the image capturer to capture an image, wherein the image is divided into a plurality of areas and the light emitted by each of the light emitters corresponds to one of the areas;
   the processor calculating a current brightness value of each area and calculating an absolute difference between the current brightness value of each area and the target brightness value;
   the processor determining whether each absolute difference is larger than a first threshold;
   according to a determination result, the processor calculating an amount M of the areas with the current brightness value larger than the target brightness value and calculating another amount N of the areas with the current brightness value smaller than the target brightness value, wherein M and N are equal to 0 or an positive integer, and M and N are not equal to 0 simultaneously;
   the processor determining whether M or N is larger than a second threshold;
   when M or N is larger than the second threshold, the processor adjusting an exposure parameter of the image capturer; and
   when M and N both are not larger than the second threshold, the processor adjusting a light emitting intensity of the light emitter corresponding to the area with the absolute difference larger than the first threshold.

7. The brightness adjusting method of claim 6, wherein when all of the absolute differences are not larger than the first threshold, the processor controls the image capturer to capture an image continuously.

8. The brightness adjusting method of claim 6, wherein if a number of the light emitters is equal to P, the second threshold is equal to [P/2], P is an positive integer larger than 1.

9. The brightness adjusting method of claim 6, wherein the processor calculates an averaged brightness value of all pixels in the area and takes the averaged brightness value to be the current brightness value.

10. The brightness adjusting method of claim 6, wherein the processor calculates a first averaged brightness value of all pixels in the area, defines a bright part in the area according to the first averaged brightness value, calculates a second averaged brightness value of all pixels in the bright part, and takes the second averaged brightness value to be the current brightness value.

* * * * *